March 5, 1963
A. SCHINDEL
3,079,810
VARIABLE RATIO MECHANISM
Filed March 7, 1961
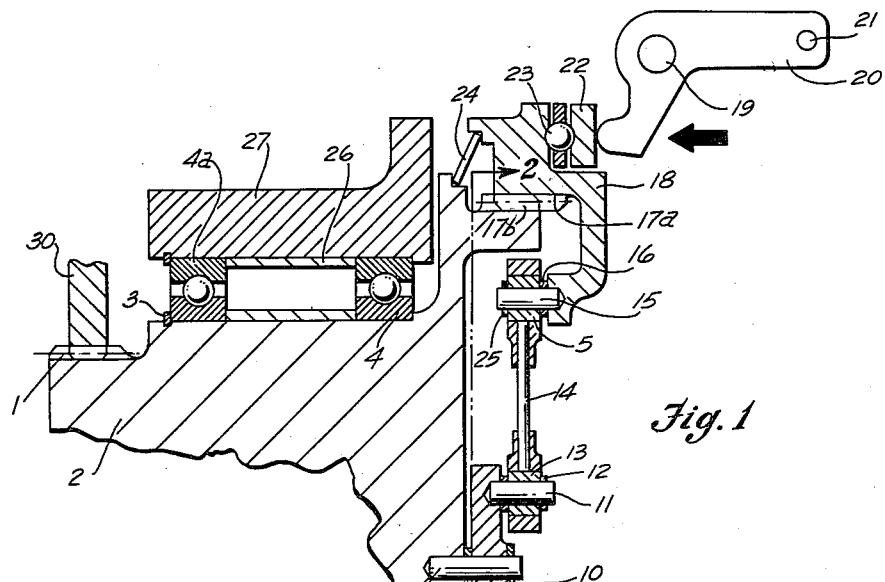
Fig. 1
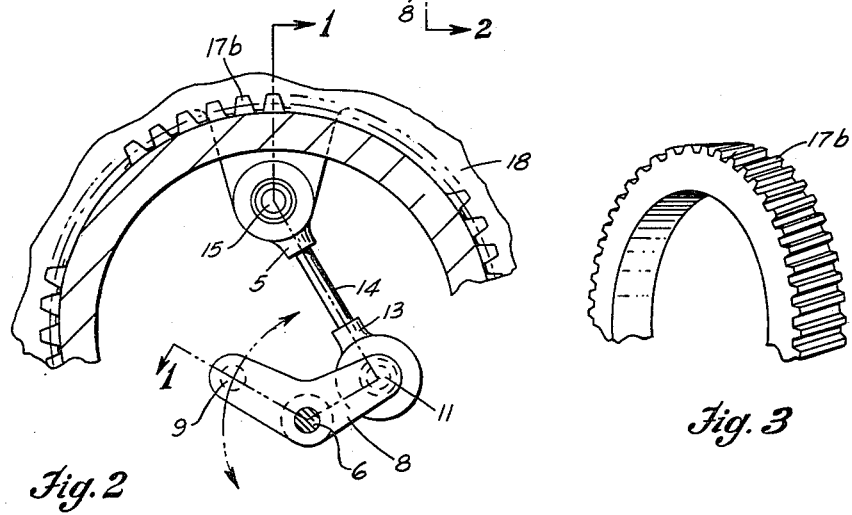
Fig. 2
Fig. 3
ARNOLD SCHINDEL
INVENTOR.
BY
ATTORNEYS United States Patent Office 3,079,810
Patented Mar. 5, 1963

3,079,810
VARIABLE RATIO MECHANISM
Arnold Schindel, Fair Lawn, N.J., assignor to General Precision Inc., Little Falls, N.J., a corporation of Delaware
Filed Mar. 7, 1961, Ser. No. 93,975
3 Claims. (Cl. 74—600)

The present invention relates to a variable ratio mechanism, and more particularly to a mechanical arrangement which can replace a ball-and-disc integrator.

Broadly stated, the present invention contemplates a compact variable ratio mechanism which can be used in driving a Whitworth mechanism or a four bar linkage and, through the use of an over-running clutch can be made to perform mechanical integration. In the device contemplated, radial displacement can be varied according to an external influence without stopping the unit to manually adjust this parameter. The contemplated arrangement is applicable to a mechanism which integrates, with time, a product of speed and another function, e.g., torque or load. The mechanical integration is accomplished by the combination of a rotatable shaft means; a first input means adapted to rotate said shaft means in direct proportion to the value of said input; internal gear means axially aligned with said shaft means towards one end thereof, one of said shaft and gear means being longitudinally displaceable from the other; spiral mating members on each of said shaft and gear means, the members on one of said shaft and gear means being adapted to spirally engage the corresponding members on the other of said shaft and gear means so as to radially displace one of said shaft and gear means from the other, said radial displacement being relative to the extent of the mating engagement; an output element normally located towards the axis of said shaft and gear means but outwardly displaceable from said axis; linking means linking said output element to one of said spiral mating members axially displacing said output element from the axis of said shaft and gear means a distance corresponding to the extent of mating engagement; and, a second input means longitudinally applicable to said gear means displacing said gear means longitudinally in direct proportion to the value of said second input. In this way, said output element can provide an integral of the values of said first and second input means.

With the foregoing brief description in view, the invention resides in the novel steps, arrangements and combinations thereof hereinafter described, it being understood that changes in the precise embodiment of the invention herein disclosed may be made within the scope of what is described without departing from the spirit of the invention.

The invention as well as other objects and advantages will become more apparent from the following description taken in conjunction with the accompanying drawing in which:

FIGURE 1 is a longitudinal cross-sectional view of the arrangement herein contemplated;

FIGURE 2 shows a transverse portion of the arrangement herein contemplated along lines 2—2 of FIGURE 1; and FIGURE 3 illustrates in perspective the pertinent portions of the view shown in FIGURE 2.

Referring to the drawing, input shaft 2 has at the left end thereof spline member 1 which mates with spur gear 30. Spur gear 30 provides the input reference speed of the device being monitored. Shaft 2 is supported by ball bearings 4 and 4a spaced at their inner races by spacer 26. The inner races are secured to shaft 2 by virtue of a shoulder at the right end and a lock ring 3. Outer races are similarly secured in fixed housing 27. Bearings are preloaded to provide fixed axial position of the shaft. At the right end of shaft 2 is an extension having a male helical spline 17b. This male helical spline 17b is better illustrated in FIGS. 2 and 3. This helical spline serves as the means of furnishing a relative rotary motion between coupled members corresponding to an applied axial or longitudinal motion.

Assembled over male helical spline 17b is internal gear means 18 incorporating female helical spline 17a. Relative axial location of shaft 2 and gear means 18 comes as a result of input rotary displacement of a bell crank lever 20 turning about a fixed pin 19 in response to an input load applied at one end of the bell crank lever, i.e., end 21. The driving surface of crank 20 is applied to gear means 18 through ball thrust bearings 23 and 22, the applied force and motion being balanced by the action of spring 24 acting on shaft 2 and gear means 18.

In shaft 2 is a pin 6 located at some convenient location intermediate the periphery and axis of shaft 2. Assembled over pin 6 is a second bell crank lever 8. This lever is axially spaced from shaft 2 by a washer 7 and is secured to the pin by a lock ring 10. Bell crank lever 8 terminates in two pins: pin 9 is the output element of the device and can drive a Whitworth sector gear, or input crank of a four bar linkage, and, pin 11 which has assembled to it one end of a spherical end link 14, which is secured by ring 12. The other end of spherical end link 14 is assembled to a pin 15 on an extension of gear means 18. This link is spaced from pin 15 by washer 16 and secured to the pin by a ring 25. Spherical link 14 includes a solid rod between rod ends 5 and 13. The entire link assembly can translate based on the motion of pin 15.

In operation, the input gear 30 drives shaft 2 through spline extension 1 causing the entire mechanism to rotate about bearings 4 and 4a including member 18 splined to shaft 2. Bell crank lever 20 is displaced about pin 19 as a function of some second input parameter, e.g., a torque, causing gear means 18 to move axially to a position corresponding to the crank displacement. Positive location is provided by the action of a spring 24. Due to the helical effect, axial displacement of gear means 18 causes a relative radial displacement of gear means 18 with respect to shaft 2, while both are rotating at continuous input speed. This relative displacement causes gear means 18 through link 14 to turn second ball crank lever 8 about pin 6, thus placing pin 9 fixed to crank 8 at a radius distance from the center of rotation proportional to the input parameter at 21, the rectified rotary motion of the device driven by output pin 9 reflects integration of the speed at 1 and the mathematical weight of the parameter at 21. Variations of position at 21 are reflected by variations in displacement of pin 9. At zero input at 21, the crank position of second bell crank lever 8 places pin 9 on the axis or centerline of shaft 2 and gear means 18 furnishing no radius vector so that the driven device indicates zero value of product of first and second inputs. When used in connection with a brake horsepower hour meter, the first input is the speed available, and the second input is the load or torque. The position of pin 9 furnishes a measure or torque supplied under load conditions. Spherical ball joints are provided in link 14, since shaft 2 and gear means 18 move in relative and rotary motion, link 14 being mounted on fixed pins must have freedom to assume oblique position to avoid binding. Relative displacement comes as a result of the helix angle of the spline and the internal linkage arrangement. Spring 24 also provides a return force causing the mechanism and input crank 20 to return to the zero position.

It is to be observed therefore that the present invention provides for a mechanical integrator, and comprises in combination, shaft means 2; a first input means, e.g., spur gear 30 adapted to rotate said shaft means in direct proportion to the speed or value of the input thereto; internal gear means 18 axially aligned with said shaft means 2 towards one end thereof, one of said shaft and gear means being longitudinally displaceable from the other; spiral mating members 17a and 17b on each of said shaft and gear means; a bell crank lever 20 turning about a fixed pin 19 in response to a second input applied to one end of said bell crank lever, adapted at the other end thereof to axially displace one of said shaft and gear means from the other with thrust bearings 22 and 23, resilient means, e.g., spring 24 tending to maintain said shaft and gear means at the no-second-input position; a second bell crank lever 8 loosely pinned at a point 6 of the cross-section of said shaft means 2 at a point intermediate the center and periphery of said shaft cross-section; a link 14 linking one crank-end 11 of second bell crank lever 8 to a pin 15 on said gear means 18, and, an output element 9 on said second bell crank lever whose relative position between the center and periphery of said shafts is determined by the action of said second input acting on said first bell crank lever 20 longitudinally moving one of said shaft and gear means with respect to the other, said longitudinal displacement at the same time causing a radial displacement of the one with respect to the other because of spiral mating members 17a and 17b, which in turn displaces second bell crank lever 8 about its pin 6 through the action of link 14.

Although the present invention has been described in conjunction with preferred embodiments, it is to be understood that modifications and variations may be resorted to without departing from the spirit and scope of the invention, as those skilled in the art readily understand. Such modifications are considered to be within the purview and scope of the invention and the appended claims.

I claim:
1. A mechanical integrator, comprising in combination; first input means; shaft means rotatable by said first input means; internal gear means axially aligned with said shaft means towards one end thereof, said gear means being longitudinally displaceable from said shaft means; spiral mating members on each of said shaft and gear means, the member on the one of said shaft and gear means being adapted to spirally engage the corresponding member on the other of said shaft and gear means so as to radially displace said gear means from said shaft means; second input means applicable to said gear means displacing said gear means longitudinally from said shaft means in response to a second input; an output element tending to be located towards the axis of said shaft and gear means but outwardly displaceable from said position; and, linking means linking said output element to said shaft and gear means, radially displacing said output element from the axis of said shaft and gear means in response to the radial displacement of the one means from the other.

2. A device as claimed in claim 1, said output element being one end of a bell crank lever, the junction of said lever being pinned to said shaft means at a point intermediate the center and periphery thereof, said linking means acting on the other end of said bell crank lever.

3. A device as claimed in claim 2, said bell crank lever junction being so pinned that said output element tends to be located at the axis of said shaft and gear means.

References Cited in the file of this patent
UNITED STATES PATENTS

| | | |
|---|---|---|
| 2,188,060 | Robins | Jan. 23, 1940 |
| 2,319,485 | Alabrune | May 18, 1943 |
| 2,569,900 | Nevin et al. | Oct. 2, 1951 |
| 2,790,332 | Caster et al. | Apr. 30, 1957 |
| 2,842,982 | Holdener | July 15, 1958 |
| 2,905,007 | Carlsen | Sept. 22, 1959 |